(12) United States Patent
Aharchaou et al.

(10) Patent No.: US 12,124,949 B2
(45) Date of Patent: Oct. 22, 2024

(54) METHODOLOGY FOR LEARNING A SIMILARITY MEASURE BETWEEN GEOPHYSICAL OBJECTS

(71) Applicant: ExxonMobil Technology and Engineering Company, Spring, TX (US)

(72) Inventors: Mehdi Aharchaou, The Woodlands, TX (US); Michael P. Matheney, The Woodlands, TX (US); Joe B. Molyneux, St. Johns (CA); Erik R. Neumann, Barsinghausen (DE)

(73) Assignee: ExxonMobil Technology and Engineering Company, Spring, TX (US)

( * ) Notice: Subject to any disclaimer, the term of this patent is extended or adjusted under 35 U.S.C. 154(b) by 761 days.

(21) Appl. No.: 17/303,012

(22) Filed: May 18, 2021

(65) Prior Publication Data
US 2021/0374465 A1    Dec. 2, 2021

Related U.S. Application Data

(60) Provisional application No. 62/704,887, filed on Jun. 2, 2020.

(51) Int. Cl.
*G06V 10/774* (2022.01)
*G06F 18/21* (2023.01)
(Continued)

(52) U.S. Cl.
CPC ............. *G06N 3/08* (2013.01); *G06F 18/217* (2023.01); *G06F 18/22* (2023.01); *G06N 5/04* (2013.01); *G06N 20/00* (2019.01); *G06V 10/774* (2022.01)

(58) Field of Classification Search
CPC ............ G06N 3/08; G06N 20/00; G06N 5/04; G06V 10/774
See application file for complete search history.

(56) References Cited

U.S. PATENT DOCUMENTS 6,738,715 B2    5/2004   Shatilo et al.
8,121,791 B2    2/2012   Lazaratos et al.
(Continued)

OTHER PUBLICATIONS

Taigman, Y. et al.,The IEEE Conference on Computer Vision and Pattern Recognition, 2014 IEE Conference on Computer Vision and Pattern Recognition, DeepFace: Closing the Gap to Human-Level Performance in Face Verification, 2014, pp. 1701-1708.

*Primary Examiner* — Edward Park
(74) *Attorney, Agent, or Firm* — ExxonMobil Technology and Engineering—Law Department

(57) ABSTRACT

A method for learning and applying a similarity measure between geophysical objects is provided. Similarity measures may be used for a variety of geophysics applications, including inverse problems. For example, an inverse problem may seek to minimize or maximize an associated objective function, which summarizes the degree of similarity between observed data and simulated data. However, when comparing between two or more geophysical objects in the context of the inverse problem, it is difficult to determine whether the observed difference between the two or more geophysical objects is due to noise or intrinsic dissimilarity between the objects. In this regard, an application-specific similarity measure, which may be tailored to the specific application, such as the specific inverse problem, may be generated and applied in order to better solve the inverse problem.

17 Claims, 14 Drawing Sheets

(51) Int. Cl.
*G06F 18/22* (2023.01)
*G06N 3/08* (2023.01)
*G06N 5/04* (2023.01)
*G06N 20/00* (2019.01)

(56) References Cited

U.S. PATENT DOCUMENTS

| | | | |
|---|---|---|---|
| 8,184,502 B2 | 5/2012 | Xu et al. | |
| 8,352,190 B2 | 1/2013 | Baumstein et al. | |
| 8,360,144 B2 | 1/2013 | Imhof | |
| 8,379,482 B1 | 2/2013 | Khare et al. | |
| 8,483,009 B2 | 5/2013 | Lee et al. | |
| 8,705,317 B2 | 4/2014 | Houck et al. | |
| 8,908,474 B2 | 12/2014 | Chu et al. | |
| 9,146,329 B2 | 9/2015 | Houck et al. | |
| 9,316,757 B2 | 4/2016 | Bansal et al. | |
| 9,784,863 B2 | 10/2017 | Bansal et al. | |
| 10,310,113 B2 | 6/2019 | Sun et al. | |
| 10,459,096 B2 | 10/2019 | Tan et al. | |
| 10,816,684 B2 | 10/2020 | Basler-Reeder et al. | |
| 10,895,654 B2 | 1/2021 | Basler-Reeder et al. | |
| 2011/0002194 A1* | 1/2011 | Imhof | G01V 1/32 367/53 |
| 2012/0243368 A1* | 9/2012 | Geiser | G01V 1/288 367/9 |
| 2014/0058678 A1 | 2/2014 | Bansal | |
| 2019/0195067 A1* | 6/2019 | Colombo | E21B 49/00 |
| 2019/0302296 A1 | 10/2019 | Aharchaou et al. | |
| 2020/0241169 A1* | 7/2020 | Li | G01N 33/24 |
| 2020/0271805 A1* | 8/2020 | Hegge | G01V 1/36 |
| 2021/0215841 A1 | 7/2021 | Aharchaou et al. | |
| 2021/0223425 A1 | 7/2021 | Sun et al. | |
| 2021/0239879 A1 | 8/2021 | Brytik et al. | |
| 2021/0262329 A1 | 8/2021 | Kaur et al. | |
| 2021/0318458 A1 | 10/2021 | Baumstein et al. | |
| 2021/0374465 A1* | 12/2021 | Aharchaou | G06F 18/24133 |
| 2022/0206176 A1* | 6/2022 | Hegde | G06N 3/045 |

* cited by examiner

METHODOLOGY FOR LEARNING A SIMILARITY MEASURE BETWEEN GEOPHYSICAL OBJECTS

CROSS REFERENCE TO RELATED APPLICATIONS

This application claims the benefit and priority of U.S. Provisional Application No. 62/704,887, the disclosure of which is incorporated herein reference in its entirety.

TECHNICAL FIELD

This disclosure relates generally to the field of geophysical prospecting and, more particularly, to learning a similarity measure between geophysical objects.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Geophysical objects comprise any type of geophysical data or attribute that may be derived from geophysical data (e.g., seismic data, well ties, velocity field, density field, anisotropy, etc.). There are various instances in which the geophysical objects are compared to determine whether the geophysical objects are similar or dissimilar. Instances of geophysical processes that rely on comparing geophysical objects include, but are not limited to: filtering; inversion (e.g., the objective function); optimal stacking; quality checking; ranking; well ties; or time-lapse.

One manner of generating a similarity measure comprises computing the l2 distance (also known as the l2 norm, the Euclidean norm or the Euclidean length), which measures distance between objects as an indicator of similarity or dissimilarity. For example, the l2 distance for a vector may be defined by squaring all the elements in the vector together, summing the squared values, and taking the square root of this sum. In this way, the l2 distance is one way in which to compare geophysical objects

SUMMARY

A computer-implemented method for learning and applying a similarity measure between geophysical objects is disclosed. The method includes: accessing a training dataset comprising training geophysical objects and corresponding training indications of the similarity measure; estimating, using the accessed training dataset, the similarity measure that inputs the training geophysical objects and outputs the training indications of the similarity measure; and applying the similarity measure by inputting the geophysical objects in order to output indications of the similarity measure, thereby indicating similarity between the geophysical objects.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION

Figure 1:
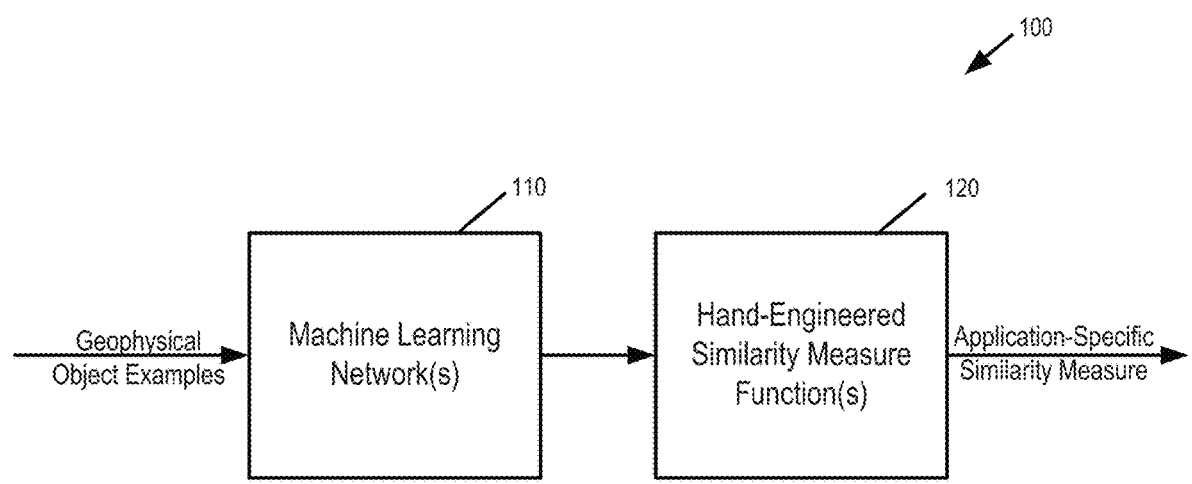
FIG. 1 is a first block diagram for learning an application-specific similarity function from geophysical object examples.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

Subsurface model is a model (or map) associated with the physical properties of the subsurface (e.g., geophysical or petrophysical models)

Geophysical model is a model associated the geophysical properties of the subsurface (e.g., wave speed or velocity, density, attenuation, anisotropy).

Petrophysical model is a model associated the petrophysical properties of the subsurface (e.g., saturation, porosity, permeability, transmissibility, tortuosity).

Geophysical data is the data probing the geophysical properties of the subsurface (e.g., seismic, electromagnetic, gravity).

Geological model is a spatial representation of the distribution of sediments and rocks (rock types) in the subsurface.

Reservoir model is a geological model of the reservoir.

Stratigraphic model is a spatial representation of the sequences of sediment and rocks (rock types) in the subsurface.

Reservoir (structural) framework is the structural analysis of reservoir based on the interpretation of 2D or 3D seismic images. For examples, reservoir framework comprises horizons, faults and surfaces inferred from seismic at a reservoir section.

Conditioning data refers a collection of data or dataset to constraint, infer or determine one or more reservoir or stratigraphic models. Conditioning data might include geophysical models, petrophysical models, seismic images (e.g., fully-stacked, partially-stacked or pre-stack migration images), well log data, production data and reservoir structural framework.

Machine learning is a method of data analysis to build mathematical models based on sample data, known as training data, in order to make predictions and or decisions without being explicitly programmed to perform the tasks.

Machine learning model is the mathematical representation of a process, function, distribution or measures, which includes parameters determined through a training procedure.

Training (machine learning) is typically an iterative process of adjusting the parameters of a neural network to minimize a loss function which may be based on an analytical function (e.g., binary cross entropy) or based on a neural network (e.g., discriminator).

Objective function (a more general term for loss function) is a measure of the performance of a machine learning model on the training data (e.g., binary-cross entropy), and the training process seeks to either minimize or maximize the value of this function.

Convolutional neural network (CNN) is a class of deep neural networks and may be used to a variety of applications, such as analyzing images. For example, a CNN may use convolution (e.g., performing a mathematical operation on two functions (f and g) that produces a third function, which expresses how the shape of one is modified by the other) instead of general matrix multiplication in one or more layers.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed above, similarity measures may be used for a variety of geophysics applications, including a variety of inverse problems. Examples of inverse problems include any one, any combination, or all of: filtering (e.g., edge-aware filtering); inversion (e.g., FWI); optimal stacking; quality checking; ranking; well ties; or time-lapse. In this way, a similarity measure, selected from a plurality of similarity measures, may be used for a specific inverse problem.

In one or some embodiments, an inverse problem uses an associated objective function as part of its process, seeking to, for example, minimize or maximize the objective function. Specifically, the objective function may include one or more terms subject to minimizing or maximizing, such as any one or both of the following terms: (i) misfit term(s) (which may be indicative of a deviation between data sets); and (ii) constraint term(s) (which may be used to enforce one or more constraints that may result in desirable properties). In this regard, the objective function may include term(s) of a data domain type and/or term(s) of a model domain type. For example, misfit term(s) measure deviation between data sets, such as measured data versus simulated data, and are a data domain type term. As another example, a penalty term over the model domain in the objective function is a model domain type term. In particular, in the context of FWI, deviation between models may comprise a model domain type term in the objective function (e.g., measuring deviation between a first model of the subsurface (which may have been generated previously) and a second model of the subsurface (which may comprise a solution in one iteration (i) in FWI). Thus, respective objective functions may be associated with each of the different applications, with the respective objective functions including one or both of data domain type terms or model domain type terms.

As one example, in inverse problems and filtering applications, an objective function summarizing the degree of similarity between observed and simulated data is used. This is relevant for full-wavefield inversion (FWI), for instance, where the goal is to "invert" for subsurface properties, such as velocity and density, based on observed prestack seismic data. See U.S. Pat. Nos. 10,310,113 and 10,459,096, both of which are incorporated by reference herein in their entirety. As another example, in various signal processing applications, the goal may comprise deriving an optimal sparse tau-p representation from prestack data via an inversion scheme. See U.S. Pat. Nos. 6,738,715, 8,352,190, and 8,483,009, each of which are incorporated by reference herein in their entirety. Likewise, in time-lapse analysis, comparison is frequently made between a base and a monitor survey to check the degree of similarity/dissimilarity between both that would inform about the location of 4D signal. See U.S. Pat. Nos. 8,705,317 and 9,146,329, both of which are incorporated by reference herein in their entirety. As yet another example, in well ties analysis, the objective is to match simulated seismic data based on well log information to the real observed data. See U.S. Pat. Nos. 8,908,474, 8,121,791, and 8,184,502, each of which are incorporated by reference herein in their entirety. In addition, quality control (QC) of how newly-processed data compares to existing templates relies on similarity measures. See U.S. Pat. No. 8,360,144, which is incorporated by reference herein in their entirety. Finally, application-specific similarity measures may be generally used in enhancing the quality of seismic images, such as edge-aware filtering, as discussed in more detail below. Thus, any discussion regarding application of application-specific similarity measures may likewise be applied to any other application disclosed herein.

However, when comparing between two or more geophysical objects such as in the context of an inverse problem (e.g., one or more terms of the objective function of the inverse problem), it is difficult to determine whether the observed difference between the two or more geophysical objects is due to noise or intrinsic dissimilarity between the objects. Typically, because of various factors, measured geophysical data may include noise (e.g., there may be uncertainties in the measured geophysical data).

To address the noise issue, geophysics similarity metrics typically rely on the Gaussian noise assumption, namely that the noise has certain Gaussian distribution characteristics (e.g., independent and identically distributed). Relying on this assumption, certain metrics, termed hand-engineered similarity measures, universal similarity measures, hand-engineered similarity measure functions, or similarity measure functions, are optimal measures for similarity and may be used for a variety of applications (thus may be generally applied to multiple applications and potentially universally applied to all applications). Examples of hand-engineered similarity measures include: means squared error; l1 distance; l2 distance; etc. In particular, a similarity metric, based on the squared differences of samples (as is determined with l2 distance) are considered reliable. In particular, solutions for the respective objective functions use the hand-engineered functions (e.g., l1, l2, etc.) for both the data domain type terms and the model domain type terms. However, this reliance on the hand-engineered functions may be misplaced due to noise concerns.

However, the noise in geophysical data is rarely, if ever, Gaussian, being much more complex than that. Consequently, the hand-engineered similarity measures, such as l2, do not address the underlying noise problem and therefore underperform. Specifically, these hand-engineered similarity measures may fail at providing sufficient complexity of the noise and its application-specific characteristics.

For example, the use of the l2 norm for tau-p representation may be undesirable when observed data includes noise that is not Gaussian. In another example, in time lapse analysis, in the absence of accurate indicators of similarity, noise may leak into the 4D signal map and generate false indicators of hydrocarbons. In yet another example, in well ties analysis, l2 distance is not robust to slight differences between the two datasets and may lead to false indicators about the degree of fit between the simulated and observed data. Thus, a more accurate similarity measure may better inform the degree of fit to the well log and therefore aid in the characterization of the subsurface. In yet another example, with regard to QC, l2 distance may not accurately describe the closeness to the desirable solution and in this sense necessitates relying on visual inspection, which can be extensive depending on the data size. A more robust similarity measure may significantly reduce the time needed to scan large volumes of data in order to detect potential artifacts and to perform a quality check.

Image enhancement is a specific example in using a similarity measure. In particular, enhancing the quality of seismic images with reduced turnaround time is central to modern-day structural and stratigraphic interpretation. Though, many filtering techniques, which assume some sort of sparsity, may not be able to effectively preserve the details in the seismic image. Alternative methods, such as anisotropic diffusion and variations of structure-oriented filtering, aim to address this limitation but are inherently limited by the noise level and the scale of discontinuities they can effectively capture.

Further, apart from quality, these techniques necessitate sufficient time to successfully apply them in production. Because sparsity fails to preserve discontinuities, many workarounds are employed in practice that result in long and over-complicated workflows. With those long workflows comes extensive QC and testing of the most suitable set of hyperparameters. Such shortcomings also apply to structure-oriented filters, where the estimation of an accurate, high-resolution dip field may be complicated.

In this regard, a more robust measure of similarity between geophysical objects is desirable for a wide range of geophysical applications, such as inversion problems, which may span inversion, time-lapse, filtering, well tie analysis, quality checking, etc. For example, the more robust measure of similarity may lead to better solutions (e.g., more accurate subsurface products in the case of FWI; or better tau-p representations in the case of pre-processing; etc.).

Thus, in one or some embodiments, a methodology is disclosed which learns an application-specific similarity measure from examples (such as application-specific examples), and thereafter applies the learned application-specific similarity measure. In this way, the application-specific similarity measure may be learned in an application-specific way, rather than being handcrafted and fixed assuming unrealistic assumptions (such as the noise being Gaussian in nature).

In one or some embodiments, application-specific similarity measures may be generated for a plurality of applications generally related to inverse problems, such as any one, any combination, or all of: filtering (e.g., edge-aware filtering); inversion (e.g., FWI); optimal stacking; quality checking; ranking; well ties; or time-lapse. In this way, responsive to determining a specific application, the similarity measure(s) associated with the specific application may be selected from the plurality of application-specific similarity measures available. This is in contrast to typical hand-engineered similarity measures, such as l2, which are generally applied in the same manner across multiple applications.

As discussed above, respective objective functions may be associated with each of the different applications, with the respective objective functions including one or both of data domain type terms or model domain type terms. In one or some embodiments, similarity measures may be tailored not only to the specific application, but also to the specific domain type (e.g., data domain type versus model domain type).

As merely one example, an FWI objective function may include: (i) misfit term(s) that measure deviation between data sets, such as measured data versus simulated data; and/or (ii) constraint or penalty term(s) that measure deviation between models (e.g., a previously generated model and a solution in one iteration (i) in FWI; a sparsity term to encourage the tau-p representation to be sparser). Similarity metrics may be generated that are tailored to the specific application (such as FWI) as well as to the specific domain type, such as to the data domain type and/or the model domain type (e.g., tailored to the data domain type for the misfit term that measures deviation between measured data and simulated data; tailored to the model domain type for the penalty or constraint term that measures deviation between a previously generated model and a solution in one iteration (i) in FWI).

In this way, the similarity measure may be tailored to one or more inverse problems in the geophysical space (e.g., an inverse problem similarity measure). In particular, similarity measures may be tailored to the different applications, such as: one or more similarity measures tailored to filtering (e.g., one or more edge-aware filtering similarity measures tailored to edge-aware filtering, including data domain edge-aware filtering similarity measure(s) tailored to edge-aware filtering and/or model domain edge-aware filtering similarity measure(s) tailored to edge-aware filtering); one or more inversion similarity measures tailored to inversion (e.g., one or more FWI similarity measures tailored to FWI, including data domain FWI similarity measure(s) tailored to FWI and/or model domain FWI similarity measure(s) tailored to FWI); one or more optimal stacking similarity measures tailored to optimal stacking (e.g., one or more optimal stacking similarity measures tailored to deriving an optimal sparse tau-p representation from prestack data, including data domain optimal stacking similarity measure(s) tailored to optimal stacking and/or model domain optimal stacking similarity measure(s) tailored to optimal stacking); etc.

Further, in one or some embodiments, at least two similarity measures, at least three similarity measures, at least four similarity measures, at least five similarity measures, etc. are used. In the instance of using multiple similarity measures, in one or some embodiments, the different similarity measures may be weighted differently. For example, a data domain similarity measure and a model domain similarity measure may both be used. In instances where data deviations are more important, the data domain similarity measure may be weighted more heavily than the model domain similarity measure (e.g., 90% weight for the data domain similarity measure versus 10% weight for the model domain similarity measure). Alternatively, in instances where it is more important not to deviate from a reference solution, the model domain similarity measure may be weighted accordingly (e.g., weighted more than the data domain similarity measure).

Various methodologies to learn the similarity measure (alternatively termed a similarity metric) are contemplated. In one or some embodiments, machine learning (such as supervised machine learning) may be used to learn the similarity measure. This machine learning methodology is in contrast to hand-engineered similarity measures, which are based on singular spectrum analysis algorithms, domain-independent, and not reliant on geophysical examples for training.

In one or some embodiments, machine learning may comprise using one or more neural networks that operate in parallel. Various neural networks are contemplated. One example neural network is convolutional neural network (CNN or convnet). Other neural networks are contemplated.

In one or some embodiments, at least two CNNs may operate in parallel. In a first specific embodiment, the at least two CNNs operating in parallel work in combination with one or more hand-engineered similarity measure in order to generate the application-specific similarity measure. As one example, the output from one, some, or each of the at least two CNNs are input to a hand-engineered similarity measure, such as l2 distance. In turn, the hand-engineered similarity measure may generate the application-specific similarity measure. In a second specific embodiment, the at least two CNNs operating in parallel do not work in combination with one or more hand-engineered similarity measure.

Referring to the figures, FIG. 1 is a first block diagram 100 for learning an application-specific similarity measure from geophysical object examples. In particular, FIG. 1 includes one or more machine learning networks 110 that receive input of geophysical object examples and generate output(s) that are, in turn, input to one or more hand-engineered similarity measure functions 120. The one or more hand-engineered similarity measure functions 120 may generate the application-specific similarity measure. In this way, the one or more hand-engineered similarity measure functions 120 do not act directly on the geophysical object examples (such as at the pixel level, see FIG. 3); instead, the one or more hand-engineered similarity measure functions 120 may operate between the outputs of the machine learning.

Moreover, FIG. 1 may be configured to compare two or more geophysical objects. In that regard, in one embodiment, only two geophysical objects are compared. Alternatively, more than two geophysical objects may be compared, and then subsequently ranked based on the generated application-specific similarity measure.

Figure 4:
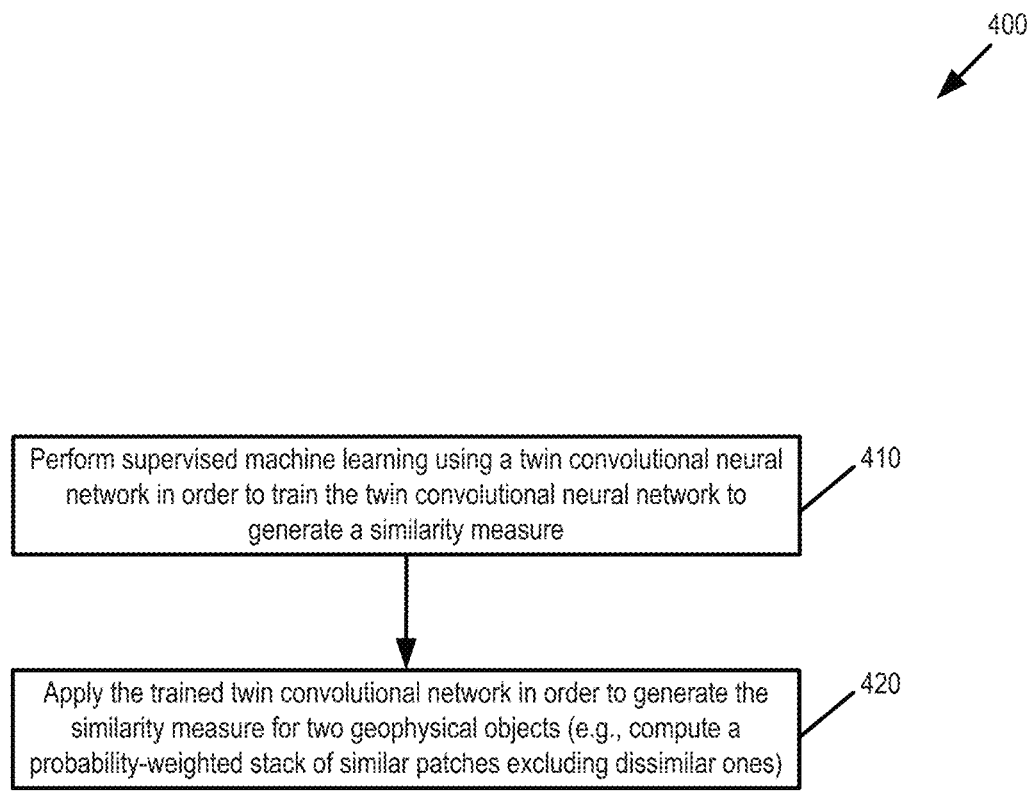
FIG. 4 is a flow diagram for learning and applying a similarity measure to geophysical object examples.

Further, as discussed below with regard to FIG. 4, the methodology may comprise two stages including: (1) learning discriminative features based on machine learning; and (2) exploiting the learned features to determine a similarity and/or dissimilarity measure for use with one or more applications. In this regard, FIG. 1 illustrates one example block diagram for learning the discriminative features for later exploitation.

Figure 2A:
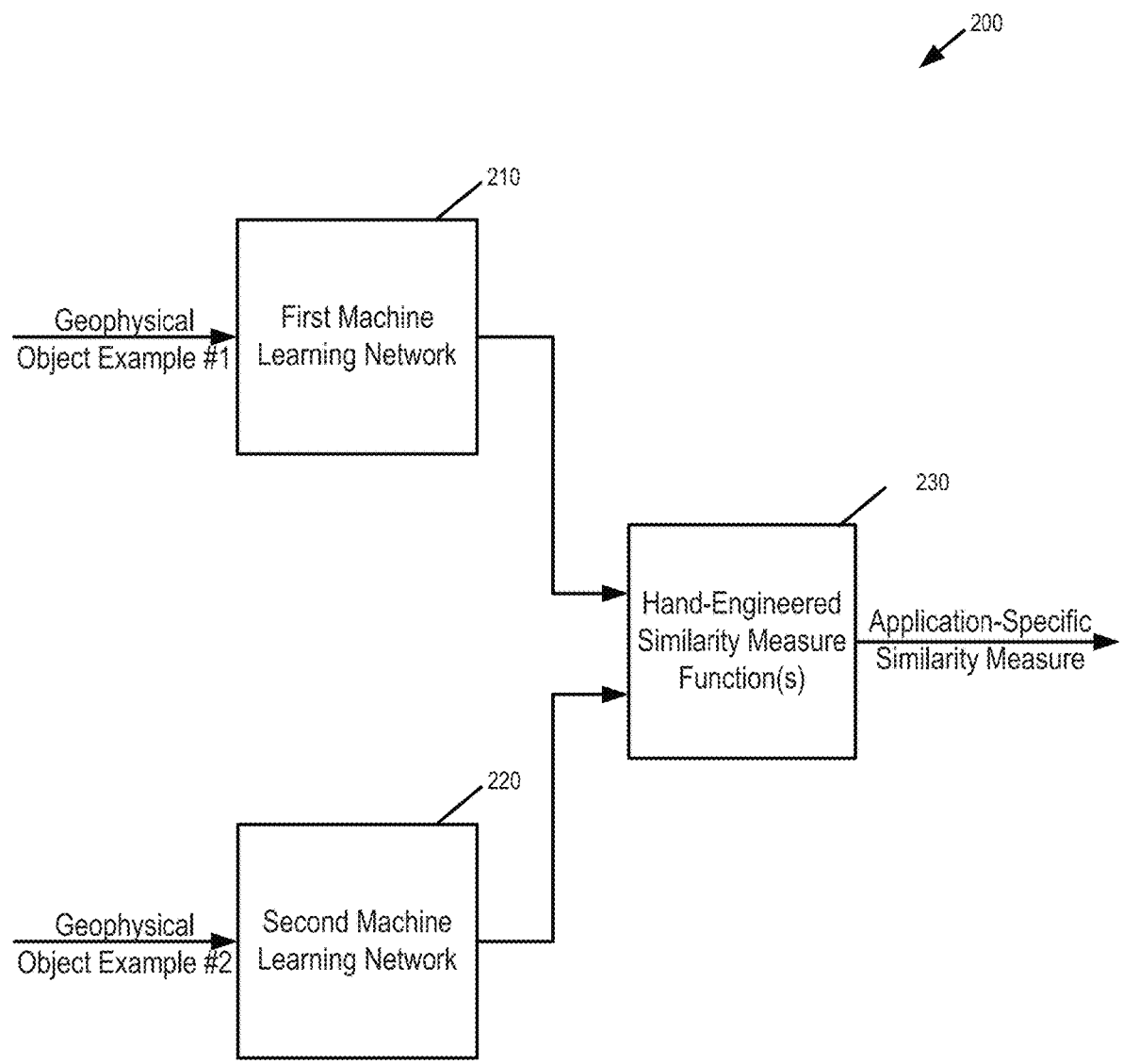
FIG. 2A is a second block diagram for learning an application-specific similarity measure from geophysical object examples in which multiple parallel machine learning networks in combination with one or more similarity measure functions generate the application-specific similarity measure.

FIG. 2A is a second block diagram 200 for learning an application-specific similarity function from geophysical object examples (geophysical object example #1; geophysical object example #2) in which multiple parallel machine learning networks operate in combination with one or more similarity measure functions in order to generate the application-specific similarity measure. The multiple parallel machine learning networks include first machine learning network 210 and second machine learning network 220. Though only two machine learning networks are illustrated, greater than two machine learning networks are contemplated as well. The outputs of first machine learning network 210 and second machine learning network 220 are input to hand-engineered similarity measure function(s) 230, which in turn outputs the similarity measure.

As discussed above, various neural networks are contemplated. One example neural network is a CNN, which may be used for learning useful features with regard to images from a supervised objective. Specifically, a CNN may be used to learn underlying image patterns simply by optimizing to a supervised classification objective. The learned representations may be hierarchical in nature, such as a first convolutional layer learning small patterns such as straight edges, a second convolutional layer learning larger patterns such as curved edges, etc. In this regard, CNNs may learn increasingly complex and abstract visual concepts of seismic image patches, yielding representations that may be far more expressive than standard, deterministically-driven transforms.

Similar to a typical CNN learning useful features based on a supervised objective, a twin CNN (alternatively known as a Siamese CNN) may do so as well. By having the training inputs labelled as either "similar" or "dissimilar", the twin CNNs may learn the discriminative features (e.g., high-level representations) that may thereafter be exploited in a "transfer learning" fashion for tasks reliant on a robust similarity measure.

Figure 2B:
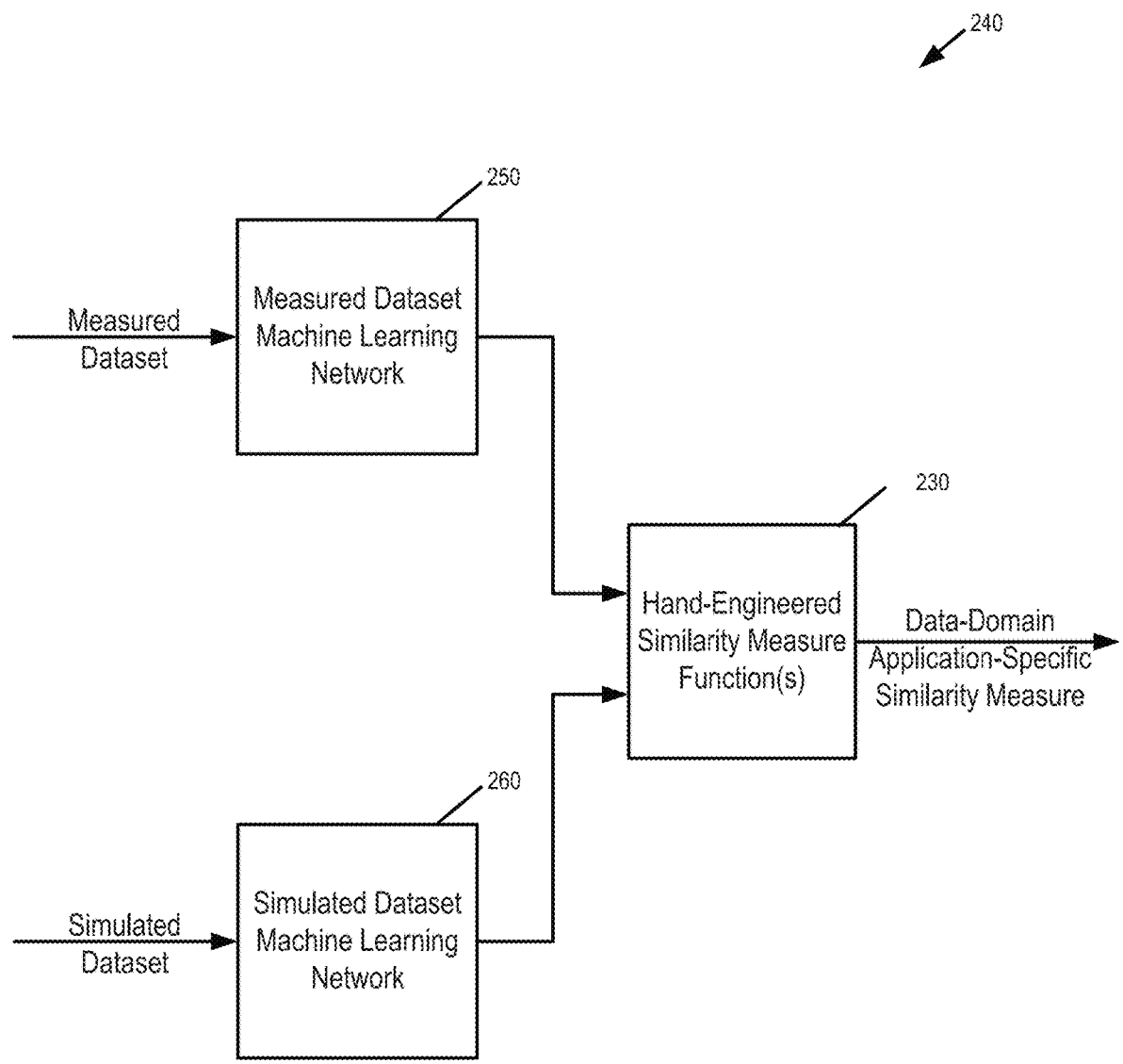
FIG. 2B is a block diagram for learning a data-domain application-specific similarity measure from geophysical object examples in which multiple parallel machine learning networks in combination with one or more similarity measure functions generate the data-domain application-specific similarity measure.
Figure 2C:
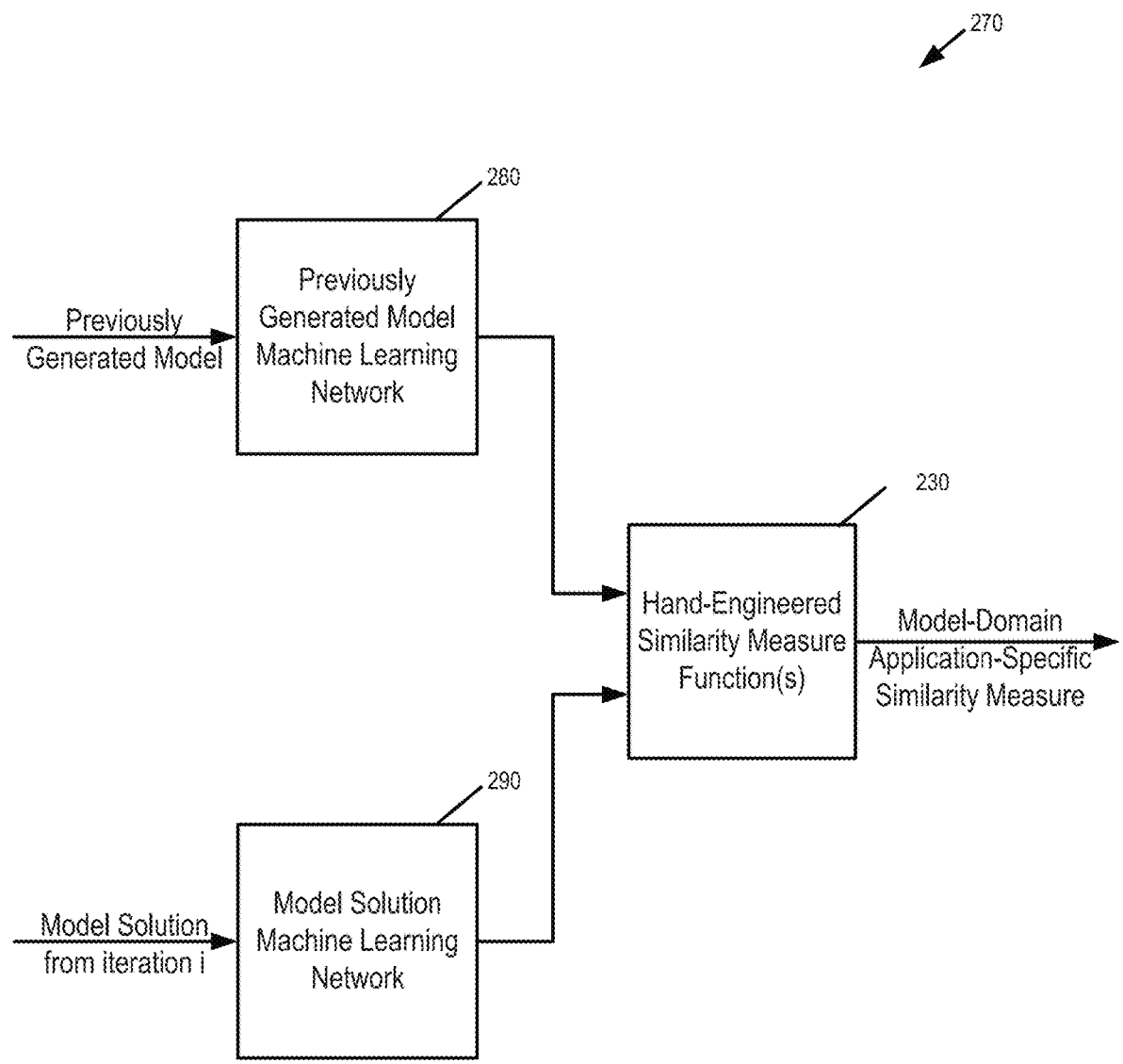
FIG. 2C is a block diagram for learning a model-domain application-specific similarity measure from geophysical object examples in which multiple parallel machine learning networks in combination with one or more similarity measure functions generate the model-domain application-specific similarity measure.

Further, as discussed above, various types of similarity measures are contemplated, including data-domain type similarity measure(s) and model-domain type similarity measure(s), such as illustrated in FIGS. 2B-C. Specifically, FIG. 2B is a block diagram 240 for learning a data-domain application-specific similarity measure from datasets (such as measured dataset and simulated dataset) in which multiple parallel machine learning networks (include measured dataset machine learning network 250 and simulated dataset machine learning network 260) in combination with one or more similarity measure functions generate the data-domain application-specific similarity measure.

FIG. 2C is a block diagram 270 for learning a model-domain application-specific similarity measure from model examples (such as previously generated model and model solution from iteration i) in which multiple parallel machine learning networks (include previously generated model machine learning network 280 and model solution machine learning network 290) in combination with one or more similarity measure functions generate the model-domain application-specific similarity measure.

In one or some embodiments, the data-domain application-specific similarity measure and the model-domain application-specific similarity measure use the same hand-engineered similarity function (as shown in block 230). As one example, for FWI, the data-domain FWI similarity measure and the model-domain FWI similarity measure both use l2. Alternatively, the data-domain application-specific similarity measure and the model-domain application-specific similarity measure use different hand-engineered similarity functions (as shown in block 230). As one example, for FWI, the data-domain FWI similarity measure may use l2 and the model-domain FWI similarity measure may use l1. In this regard, the machine learning networks and the hand-engineered similarity functions may both be tailored to the respective type of similarity measure.

Figure 3:
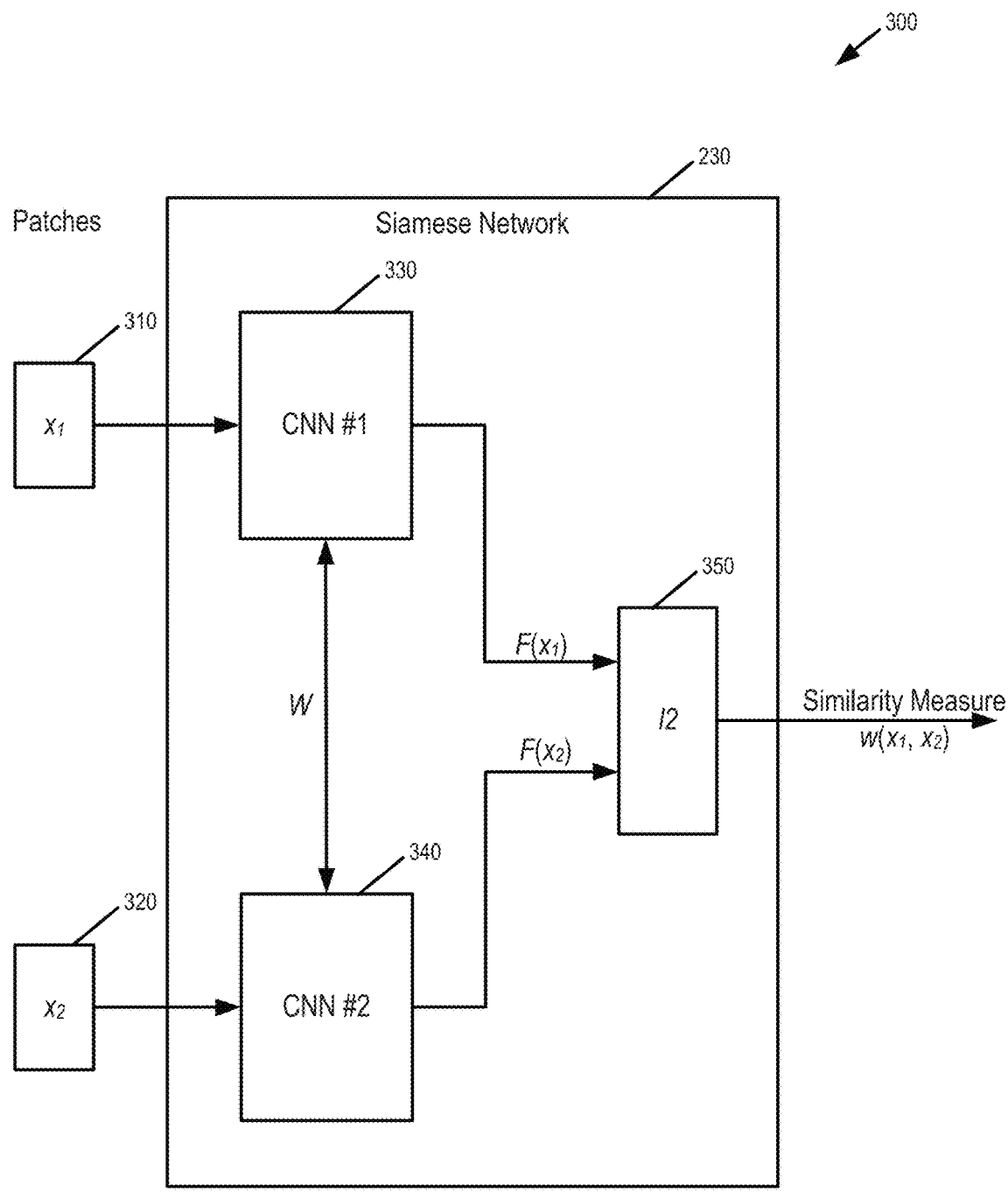
FIG. 3 is a third block diagram for learning an application-specific similarity measure from geophysical object examples in which multiple convolutional neural networks in combination with l2 distance function generate the similarity measure.

FIG. 3 is a third block diagram 300 for learning an application-specific similarity function from geophysical object examples in which multiple convolutional neural networks in combination with l2 distance function generate the similarity measure. As discussed above, the disclosed methodology may be used for various applications, including determining similarity and/or dissimilarity of images (such as image patches within a same image and/or amongst different images). Twin CNNs may be used in various computer vision applications, such as face verification tasks, where differences in illumination, angle, and facial expression may exist between pictures of the same person. In this regard, systems based on deep twin CNNs (e.g., DeepFace) have shown incredible performance and attained human-level performance. Unlike a typical convnet which acts on individual training inputs, the twin architecture comprises (or consists of) twin sub-networks which accept distinct inputs joined by the l2 distance at the output, such as illustrated in FIG. 3.

In that regard, patches $x_1$ 310 and $x_2$ 320 are input, respectively, to CNN #1 (330) and CNN #2 (340). In turn, CNN #1 (330) generates output $F(x_1)$ and CNN #2 (340) generates output $F(x_2)$ (e.g., $F(x_1)$ and $F(x_2)$ is generated based on matrix multiplication of W with respective input patches $x_1$ 310 and $x_2$ 320). $F(x_1)$ and $F(x_2)$ are input to l2 (350), with l2 (350) generating similarity measure $w(x_1, x_2)$. Thus, CNN #1 (330) and CNN #2 (340) may be used to learn a similarity function based on seismic image patches, such as patches $x_1$ 310 and $x_2$ 320. In this way, the twin CNNs may analyze images of regarding seismic data.

Further, the l2 distance is computed not at the input pixel level but between the high-level feature vectors on each side. As discussed above, computing l2 distance directly on the inputs may not be robust due to noise and may thus not be an acceptable direct measure. Instead, l2 may be calculated based on feature vectors ($F(x_1)$ and $F(x_2)$), which are outputs of CNN #1 (330) and CNN #2 (340). Those feature vectors may be more invariant and therefore much more robust to the imperfections in the input patches $x_1$ 310 and $x_2$ 320.

FIG. 3 illustrates patches $x_1$ 310 and $x_2$ 320 as inputs. In one or some embodiments, one input, such as one of the patches may comprise an anchor and may be compared to a single other patch (e.g., a pairwise comparison) or a plurality of other patches (e.g., a multi-patch similarity measure). For example, one image patch in the image illustrated in FIG. 5 may be compared to at least dozens of other images patches in the image illustrated in FIG. 5. In such a multi-patch comparison, the similarity measure may comprise a matrix indicative of the similarity to the various patches.

Further, FIG. 3 illustrates image patches, which are 2-D, as input. Alternatively, the input for any one, any combination, or all of FIGS. 1-3 may be 1-D, 3-D (e.g., volume data; for seismic data in post-stack domain, X, Y, and time (or depth)), 4-D (e.g., volume data and time), 5-D (e.g., in the context of seismic data in pre-stack domain: source X location; source Y location; receiver X location; receiver Y location; time dimensions), 6-D, 7-D (e.g., concatenate geographical objects in different ways to form 7-D input), or more.

Moreover, FIG. 3 illustrates a CNN. Alternatively, other neural networks may be used depending on the geophysical objects subject to the similarity determination. As one example, recurrent neural networks may be used in a twin architecture as shown in FIG. 3 in the context of 1-D input signals.

Thus, FIG. 3 illustrates training of the twin convolutional neural network for edge-aware filtering. Alternatively, training for FWI may comprise inputting observed data and simulated data (e.g., finite-difference simulated data given a temporary surface model solution). Training for tau-p inversion may comprise inputting the observed data and the simulated data (e.g., the back-projected data from the tau-p domain to t-x domain). For 4D analysis, training may comprise inputting data from the base and monitor surveys (e.g., at a certain processing stage). For well ties, training may comprise inputting real seismic traces (e.g., in an image) and synthetic traces simulated from the well log. In this way, the twin convolutional neural network may be trained using different datasets tailored to the different inverse problems.

Further, in one or some embodiments, the training datasets may be selected for sufficient-quality training data. For example, if the guiding similarity measure (e.g., SSA for edge-aware filtering) is a poor indicator of similarity, this may affect the similarity learning. Hence, in one or some embodiments, a pre-processing workflow may be used to ensure the input-label pairs (used for training) reasonably capture the learned metric (e.g., removing outliers in the data).

In this way, the edge-aware filtering methodology, whose blocks are illustrated in FIG. 3, may be used in two stages: (1) learning discriminative features based on a deep twin CNNs; and (2) exploiting the learned features to compute a probability-weighted stack of similar patches excluding dissimilar ones. An example of the two stages is illustrated in FIG. 4, which is a flow diagram 400 for generating and applying a similarity measure to geophysical object examples. At 410, supervised machine learning is performed using twin CNNs in order to train the twin CNN to generate a similarity measure. Thus, the objective at 410 is pair-wise feature learning. To train the network, many pairs of patches extracted from a seismic volume are provided. A label is associated with each pair indicating whether the patches are "similar" or "dissimilar". Since the objective is not metric learning (where the goal may be to overfit the labels), various attributes may be used to obtain a reference measure of similarity. In this way, the process of supervised machine learning may comprise supplying the training system with known inputs and outputs in order to determine or learn the W, which may represent the neural network parameters (e.g., the "weights" of the neural network).

The attributes may be application specific. In edge-aware filtering, example attributes include any one, any combination, or all of: discontinuity attributes; semblance criterion; coherency type of measurements; or singular spectrum analysis (SSA) (e.g., SSA is a noise suppression methodology which assumes coherent signals; when supplied with incoherent signals (e.g., a fault), SSA generates a high value, thereby making SSA suitable for a discontinuity measure). For example, with the SSA attribute, the labels used may be based on a binary adaptation of an SSA roundtrip difference. The motivation is to "learn from" the mistakes made by a method unaware to edges.

At 420, the trained twin CNNs are applied in order to generate the similarity measure for two geophysical objects. The generated similarity measure may then be used in a variety of contexts, such as for image enhancement (e.g., edge awareness). In one or some embodiments, the similarity measure may be used in order to stack a first set of patches within the seismic image (such as stacking image patches that exhibit sample-by-sample similarity 510) that are similar and exclude a second set of patches (such as exclude other patches that do not exhibit such similarity) within the seismic image in order to perform the edge awareness (e.g., a probability-weighted stack of similar patches excluding dissimilar ones). For example, once the network is trained, the learnt convolutional base (W in FIG. 3) may be extracted and put as a sigmoid function that, given a new pair of inputs, "squashes" the output to a probability. For example, patches that are most similar will have a probability closest to a first predetermined value (e.g., "1"), whereas other patches that are least similar will have a probability close to a second predetermined value (e.g., "0"). In this regard, various outputs of the application-specific similarity measure are contemplated, including a scalar measure indicative of how similar or dissimilar the two image patches are to each other.

Thus, given a reference sample and its local neighborhood, one, some or all of the surrounding samples may be stacked and weighted by their probabilities. The probability of each sample may be computed based on its neighborhood's similarity relative to the reference patch. Similar patches (e.g., with probability close to 1) will contribute most to the stack, dissimilar ones (e.g., probability close to 0) will contribute least.

Figure 5:
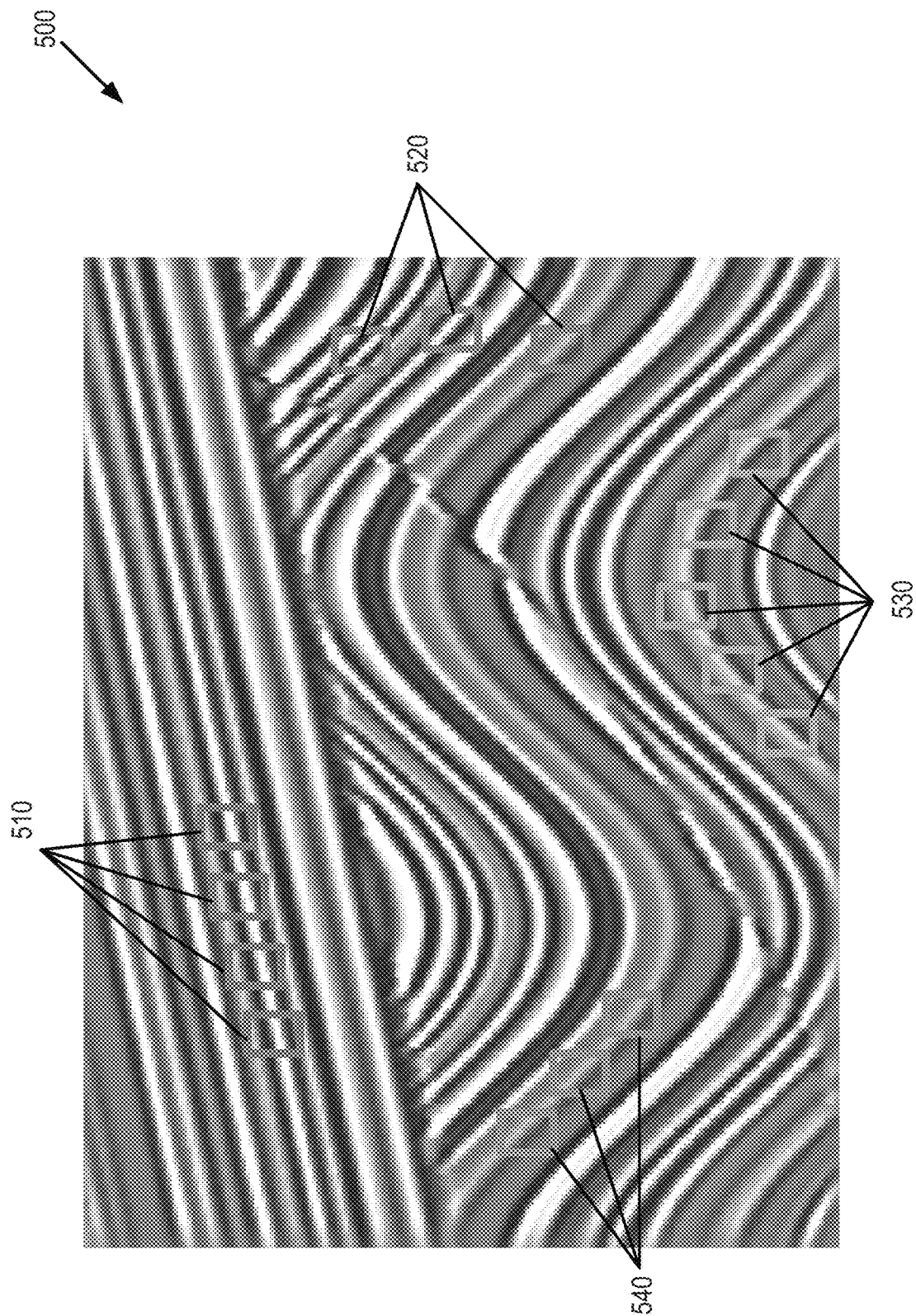
FIG. 5 is an image with different types of similarity within the image highlighted.

FIG. 5 is an image 500 with different types of similarity within the image 500 highlighted. Generally speaking, when examining a small patch (or first subsection) within an image, it is likely that other patches (or other subsections) within the image will exist that look the same as the small patch (or the first subsection). As shown in FIG. 5, similarity may exist under different forms. In particular, FIG. 5 illustrates different types of similarity, including sample-by-sample similarity 510, shape-invariant similarity 520, rotation-invariant similarity 530, and shift-invariant similarity 540. Other types of similarity are contemplated.

In the presence of noise, simply by stacking patches that are similar and excluding those that are dissimilar, one may achieve "within-image" stacking power endowed with edge awareness. In this regard, this process may rely on a similarity measure that is invariant (or less variant) to noise and small shifts. For example, if there are two nearly identical patches within the image and one is moved over by a few pixels to the right, the Euclidian distance (e.g., the straight line distance) may change from being zero to being very high. Hence, the Euclidian distance may not necessarily provide a robust similarity measure in the raw image space. In this regard, using the application-specific similarity measure in the context of edge-awareness may improve processing of seismic images, as shown in more detail below.

FIGS. 6A-F illustrate a first example of the methodology to a field dataset containing various structural and stratigraphic features. For example purposes, training was performed on a limited portion that includes a sufficient variety in discontinuities and edges. In the example, the training comprised approximately 500,000 pairs, with 50% of the pairs comprising similar patches and the other 50% of the pairs comprising dissimilar patches. The validation set comprised 400 pairs roughly in the same proportions. As a regularization measure, validation-based early stopping was used to avoid overfitting. In the example, training was performed over a few days on an 8 K100 GPU cluster.

Figure 6B:
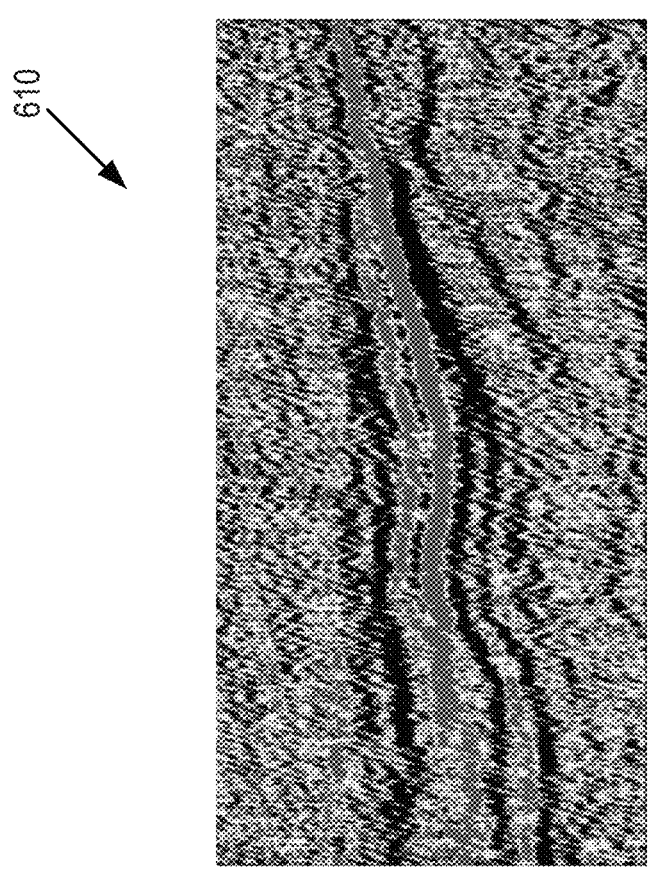
FIG. 6B is a subsection of the unprocessed seismic image illustrated in FIG. 6A.
Figure 6A:
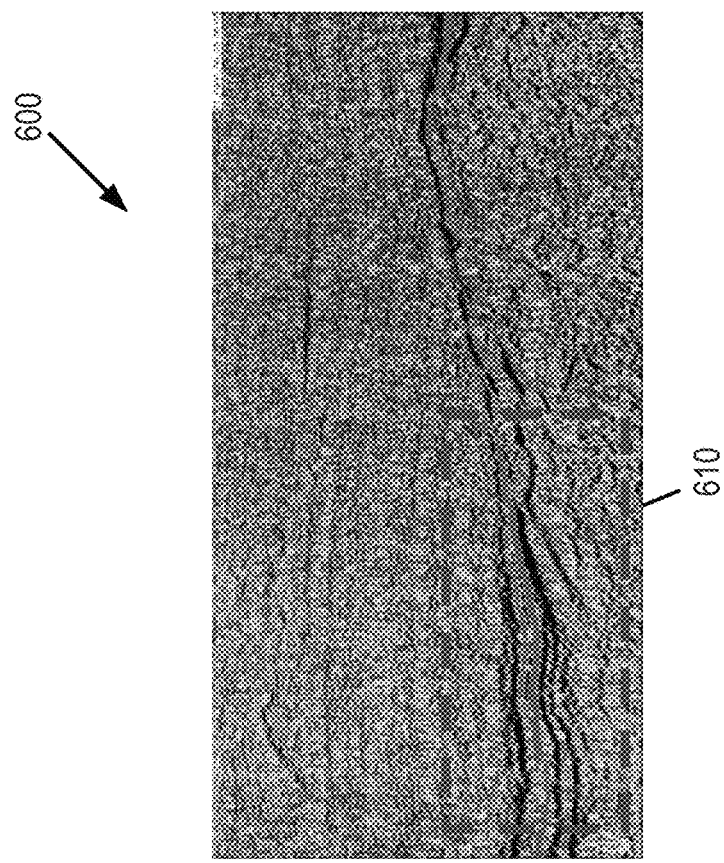
FIG. 6A is a first example of an unprocessed seismic image.
Figure 6D:
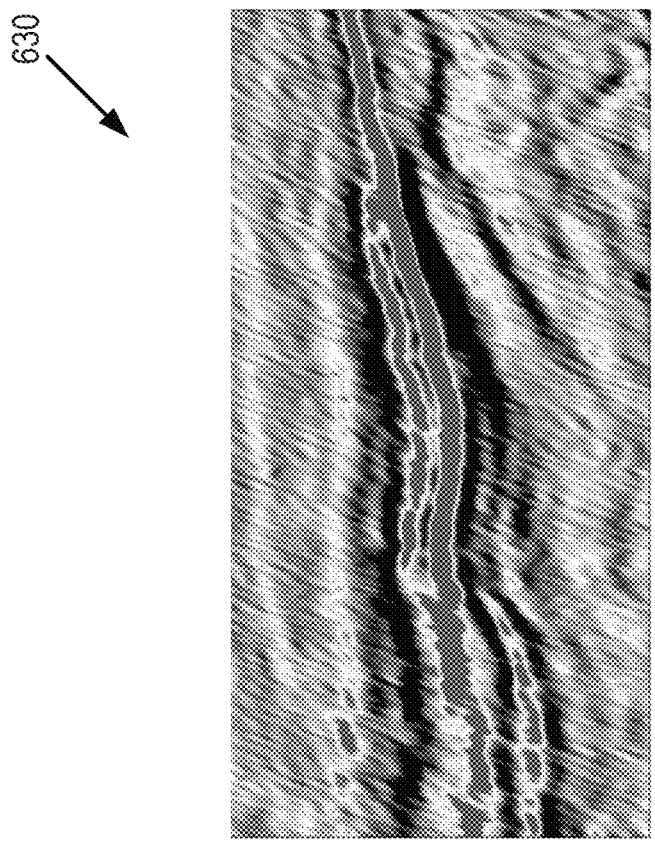
FIG. 6D is a subsection of the image illustrated in FIG. 6C.
Figure 6C:
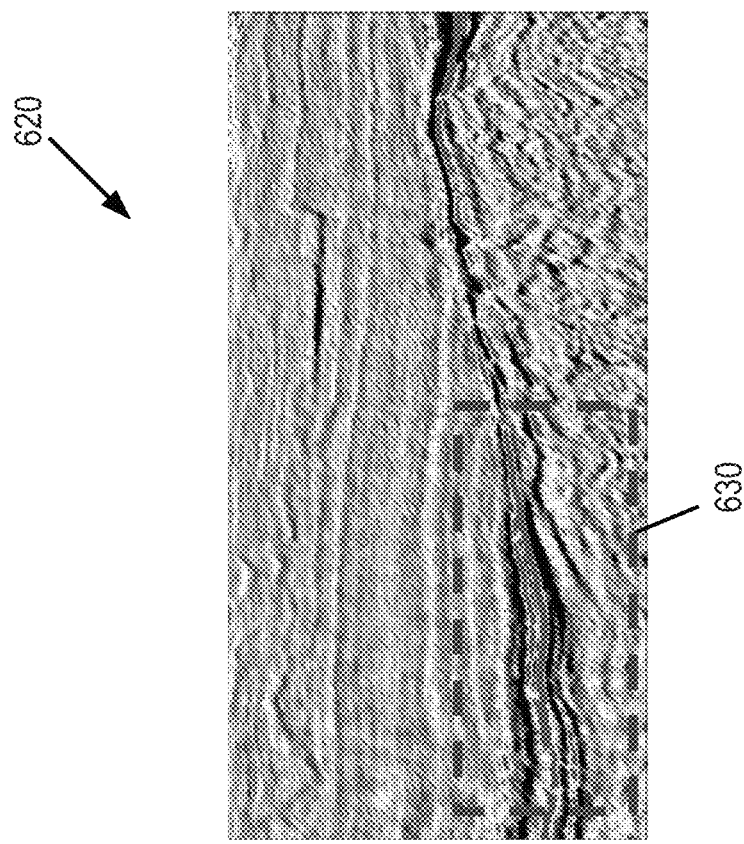
FIG. 6C is an image generated after applying 3D anisotropic diffusion to the unprocessed seismic image illustrated in FIG. 6A.
Figure 6F:
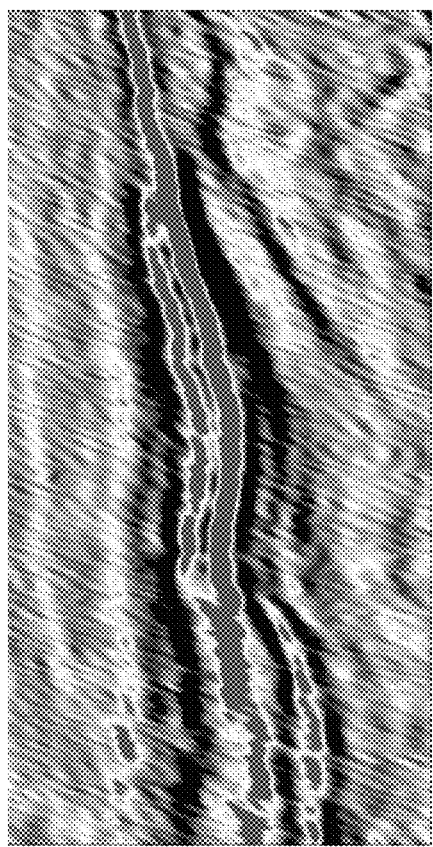
FIG. 6F is a subsection of the image illustrated in FIG. 6E.
Figure 6E:
FIG. 6E is an image generated after applying edge-aware filtering to the unprocessed seismic image illustrated in FIG. 6A.

FIG. 6A is a first example of an unprocessed seismic image 600. FIG. 6B is a subsection 610 of the unprocessed seismic image 600 illustrated in FIG. 6A. FIG. 6C is an image 620 generated after applying 3D anisotropic diffusion to the unprocessed seismic image 600 illustrated in FIG. 6A. FIG. 6D is a subsection 630 of the image 620 illustrated in FIG. 6C. FIG. 6E is an image 640 generated after applying edge-aware filtering to the unprocessed seismic image 600 illustrated in FIG. 6A. FIG. 6F is a subsection 650 of the image 640 illustrated in FIG. 6E. As shown, significant high-frequency noise exists in the input image volume (see FIGS. 6A-B) due to the application of inverse amplitude Q compensation. While both filtering techniques removed much of that noise, it is evident that a significant remaining amount on the anisotropic diffusion version. See FIGS. 6C-D. Edge-aware filtering, in contrast, removed the noise more effectively and resulted in horizons that are much more coherent. See FIGS. 6E-F.

Figure 7C:
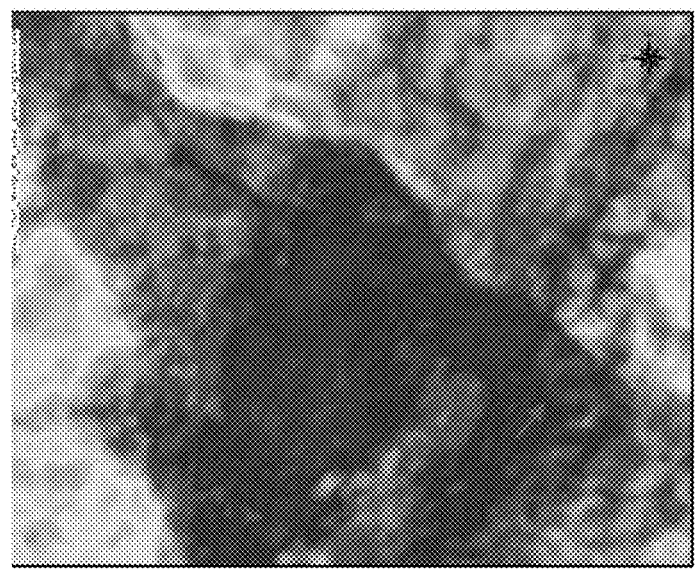
FIGS. 7A-C are images of amplitude maps extracted at a key horizon, with FIG. 7A illustrating an input noisy volume, FIG. 7B illustrating applying 3D anisotropic diffusion to the input noisy volume, FIG. 7C illustrating applying edge-aware filtering to the input noisy volume.
Figure 7B:
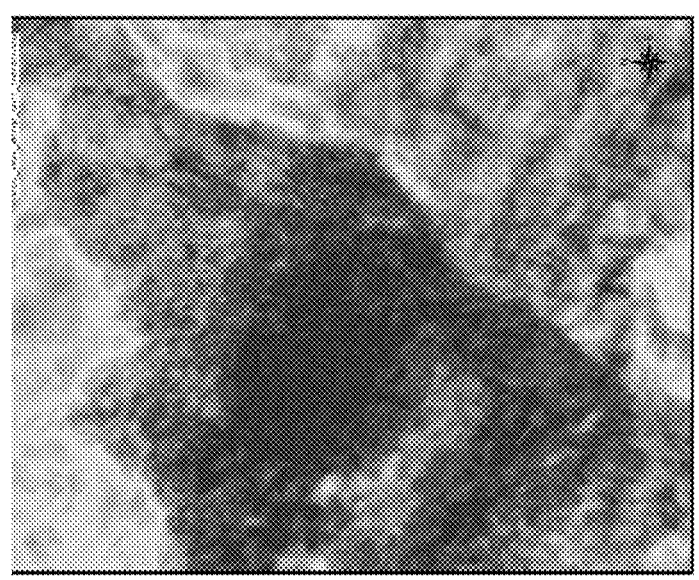
Figure 7A:

FIGS. 7A-C are images of amplitude maps extracted at a key horizon, with FIG. 7A illustrating an image 700 of an input noisy volume, FIG. 7B illustrating image 710 after applying 3D anisotropic diffusion to the image 700 of the input noisy volume, and FIG. 7C illustrating an image 720 after applying edge-aware filtering to the image 700 of the input noisy volume. In this way, FIGS. 7A-C compare RMS amplitude maps extracted at a key horizon. The amplitude map from edge-aware filtering (see FIG. 7C) exhibits higher resolution owing to the superior filtering performance than the amplitude map from 3D anisotropic diffusion (see FIG. 7B). In particular, the image 720 in FIG. 7C illustrates meandering channels much more clearly.

Figure 8C:
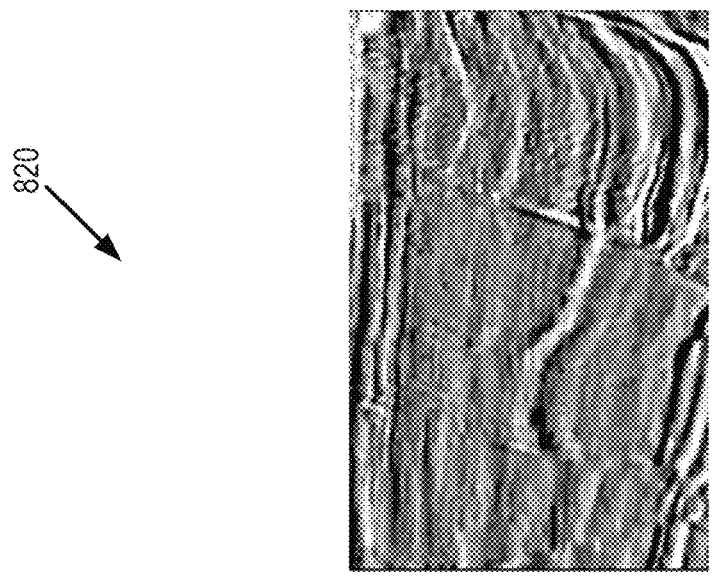
FIG. 8C is an image generated after applying edge-aware filtering to the unprocessed seismic image illustrated in FIG. 8A.
Figure 8B:
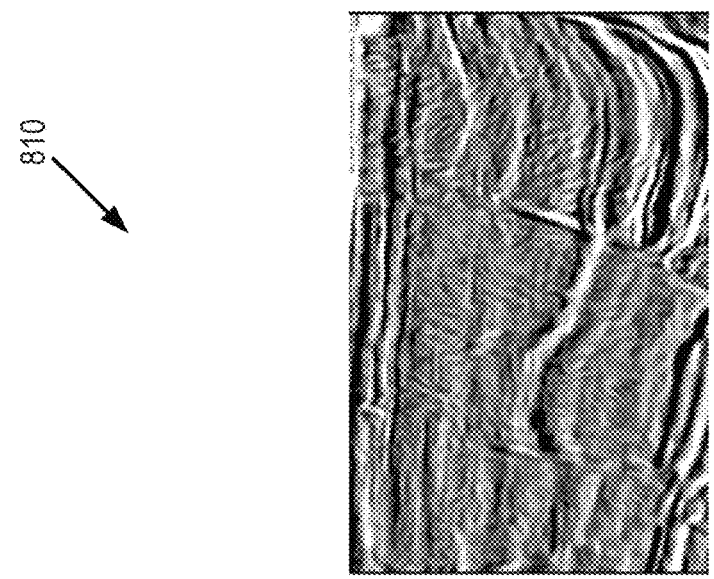
FIG. 8B is an image generated after applying 3D anisotropic diffusion to the unprocessed seismic image illustrated in FIG. 8A.
Figure 8A:
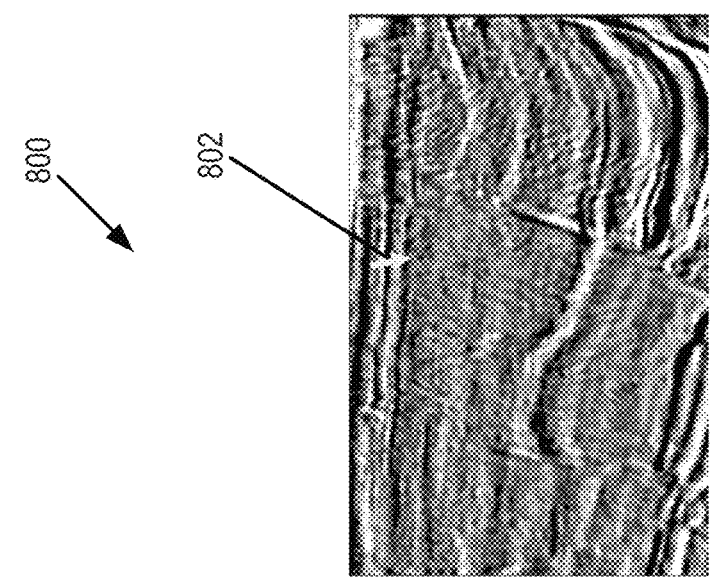
FIG. 8A is an example of an unprocessed seismic image.

FIG. 8A is an example of an unprocessed seismic image 800, and includes an arrow 802 highlighting point diffractors. FIG. 8B is an image 810 generated after applying 3D anisotropic diffusion to the unprocessed seismic image 800 illustrated in FIG. 8A. FIG. 8C is an image 830 generated after applying edge-aware filtering to the unprocessed seismic image 800 illustrated in FIG. 8A. Comparing the image 810 in FIG. 8B and the image 820 in FIG. 8C, the point diffractors, highlighted by arrow 802 in FIG. 8A, are better preserved by the edge-aware filtering in image 820 in FIG. 8C. In this regard, the image 820 generated by the edge-aware filtering seems more geologically meaningful, and has superior preservation of flat horizons and point diffractors than the image 810 generated by the 3D anisotropic diffusion, which may appear overly "edgy" (e.g., caused by preserving both the signal and the straight-edge noise).

Figure 8E:
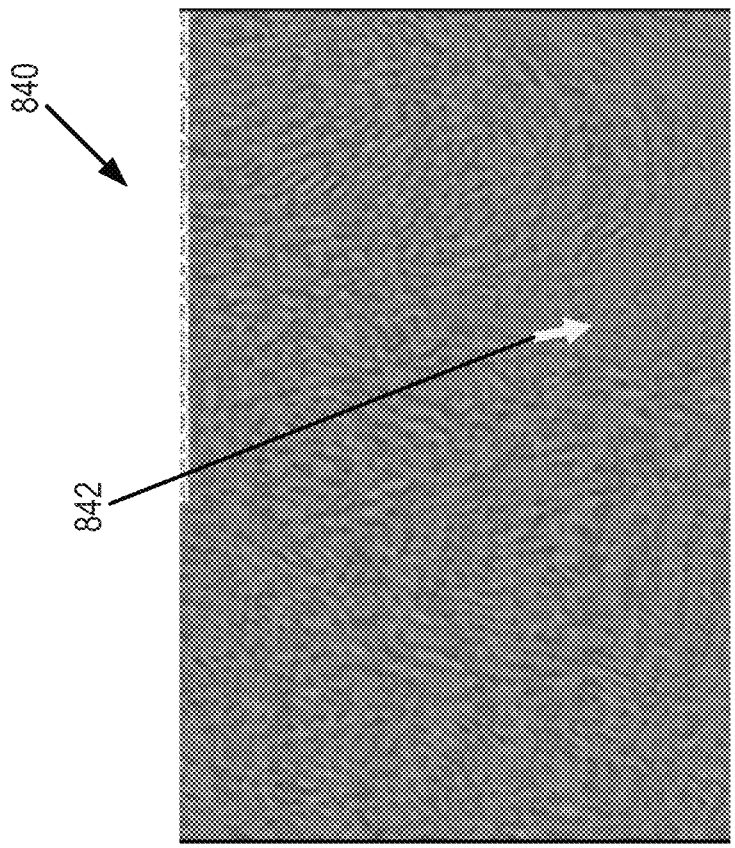
FIG. 8E is an image showing the difference between the unprocessed seismic image illustrated in FIG. 8A and the image generated after applying edge-aware filtering illustrated in FIG. 8C.
Figure 8D:
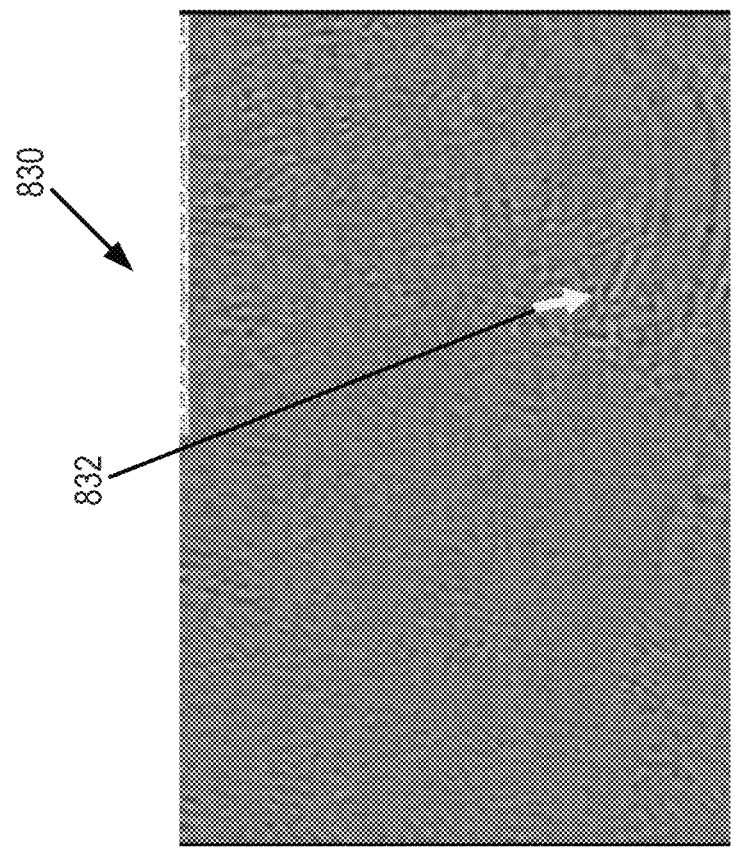
FIG. 8D is an image showing the difference between the unprocessed seismic image illustrated in FIG. 8A and the image generated after applying 3D anisotropic diffusion illustrated in FIG. 8B.

FIG. 8D is an image 830 showing the difference between the unprocessed seismic image 800 illustrated in FIG. 8A and the image 820 generated after applying 3D anisotropic diffusion illustrated in FIG. 8B. FIG. 8E is an image 840 showing the difference between the unprocessed seismic image 800 illustrated in FIG. 8A and the image 820 generated after applying edge-aware filtering illustrated in FIG. 8C. Ideally, the difference between a processed image and its underlying unprocessed image is only noise (and not meaningful signal). Arrow 832 in FIG. 8D points to amplitudes that are following the horizon. In this regard, FIG. 8D includes meaningful signals. Arrow 842 in FIG. 8E is pointing to the same location; however, there is less of those amplitudes, thereby indicating that the edge-aware filtering is filtering out less meaningful signals.

Figure 9:
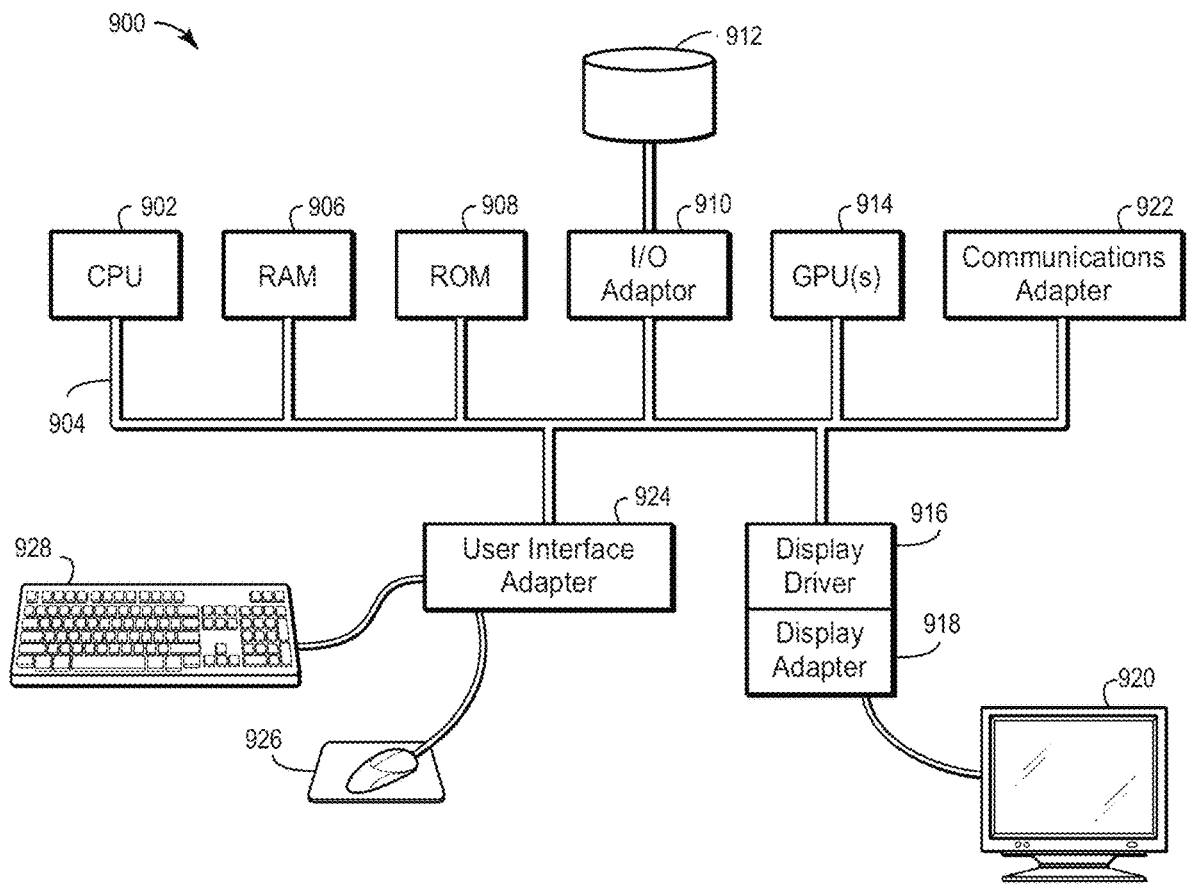
FIG. 9 is a diagram of an exemplary computer system that may be utilized to implement the methods described herein.

In all practical applications, the present technological advancement must be used in conjunction with a computer, programmed in accordance with the disclosures herein. For example, FIG. 9 is a diagram of an exemplary computer system 900 that may be utilized to implement methods described herein. A central processing unit (CPU) 902 is coupled to system bus 904. The CPU 902 may be any general-purpose CPU, although other types of architectures of CPU 902 (or other components of exemplary computer system 900) may be used as long as CPU 902 (and other components of computer system 900) supports the operations as described herein. Those of ordinary skill in the art will appreciate that, while only a single CPU 902 is shown in FIG. 9, additional CPUs may be present. Moreover, the computer system 900 may comprise a networked, multi-processor computer system that may include a hybrid parallel CPU/GPU system. The CPU 902 may execute the various logical instructions according to various teachings disclosed herein. For example, the CPU 902 may execute machine-level instructions for performing processing according to the operational flow described.

The computer system 900 may also include computer components such as non-transitory, computer-readable media. Examples of computer-readable media include computer-readable non-transitory storage media, such as a random access memory (RAM) 906, which may be SRAM, DRAM, SDRAM, or the like. The computer system 900 may also include additional non-transitory, computer-readable storage media such as a read-only memory (ROM) 908, which may be PROM, EPROM, EEPROM, or the like. RAM 906 and ROM 908 hold user and system data and programs, as is known in the art. The computer system 900 may also include an input/output (I/O) adapter 910, a graphics processing unit (GPU) 914, a communications adapter 922, a user interface adapter 924, a display driver 916, and a display adapter 918.

The I/O adapter 910 may connect additional non-transitory, computer-readable media such as storage device(s) 912, including, for example, a hard drive, a compact disc (CD) drive, a floppy disk drive, a tape drive, and the like to computer system 900. The storage device(s) may be used when RAM 906 is insufficient for the memory requirements associated with storing data for operations of the present techniques. The data storage of the computer system 900 may be used for storing information and/or other data used or generated as disclosed herein. For example, storage device(s) 912 may be used to store configuration information or additional plug-ins in accordance with the present techniques. Further, user interface adapter 924 couples user input devices, such as a keyboard 928, a pointing device 926 and/or output devices to the computer system 900. The display adapter 918 is driven by the CPU 902 to control the display on a display device 920 to, for example, present information to the user such as subsurface images generated according to methods described herein.

The architecture of computer system 900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 900 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed.

Embodiment 1: A computer-implemented method for learning and applying a similarity measure between geophysical objects, the method comprising: accessing a training dataset comprising training geophysical objects and corresponding training indications of the similarity measure; estimating, using the accessed training dataset, the similarity measure that inputs the training geophysical objects and outputs the training indications of the similarity measure; and applying the similarity measure by inputting the geophysical objects in order to output indications of the similarity measure, thereby indicating similarity between the geophysical objects.

Embodiment 2: The method of embodiment 1: wherein estimating the similarity measure comprises using machine learning in order to learn the similarity measure between the training geophysical objects.

Embodiment 3: The method of embodiments 1 or 2: wherein the machine learning comprises supervised machine learning in which the training indications of the similarity measure between the training geophysical objects are known.

Embodiment 4: The method of embodiments 1-3: wherein the machine learning comprises at least two neural networks operating in parallel.

Embodiment 5: The method of embodiments 1-4: wherein the machine learning comprises at least two convolutional neural networks operating in parallel.

Embodiment 6: The method of embodiments 1-5: wherein the output of the at least two convolutional neural networks operating in parallel are input to a similarity measure function, the similarity measure function generating, based on the output of the at least two convolutional neural networks, the indications of the similarity measure.

Embodiment 7: The method of embodiments 1-6: wherein the similarity measure function comprises an l2 distance function.

Embodiment 8: The method of embodiments 1-7: wherein the similarity measure is used as part of full wavefield inversion in which an objective function uses the similarity measure as indicative of a degree of similarity between observed and simulated data.

Embodiment 9: The method of embodiments 1-8: wherein the similarity measure is tailored to enhancing a seismic image.

Embodiment 10: The method of embodiments 1-9: wherein the similarity measure is tailored to edge awareness within the seismic image.

Embodiment 11: The method of embodiments 1-10: wherein applying the similarity measure comprises using the similarity measure in order to stack a first set of patches within the seismic image that are similar and exclude a second set of patches within the seismic image in order to perform the edge awareness.

Embodiment 12: The method of embodiments 1-11: wherein the similarity measure inputs pairs of the geophysical objects and outputs a respective indication of the similarity measure for the pairs of the geophysical objects.

Embodiment 13: The method of embodiments 1-12: wherein the similarity measure inputs sets of the geophysical objects and outputs a respective indications in a similarity measure matrix for the sets of the geophysical objects.

Embodiment 14: The method of embodiments 1-13: the similarity measure is tailored to a specific inverse problem.

Embodiment 15: The method of embodiments 1-14: wherein multiple similarity measures are generated for a plurality of inverse problems; and wherein the multiple similarity measures comprises at least two of: filtering; inversion; optimal stacking; quality checking; ranking; well ties; or time-lapse.

Embodiment 16: The method of embodiments 1-15: wherein the similarity measure is tailored based on domain type.

Embodiment 17: The method of embodiments 1-16: wherein the specific inverse problem has a specific objective function, the specific objective function including at least one of a data domain term and a model domain term; and wherein the similarity measure is tailored to the at least one of the data domain term for the specific objective function or the model domain term for the specific objective function.

Embodiment 18: The method of embodiments 1-17: wherein multiple similarity measures are used to solve the specific objective function for the specific inverse problem including a data domain similarity measure and a model domain similarity measure.

Embodiment 19: The method of embodiments 1-18: wherein, in solving the specific objective function, the data domain similarity measure is weighted differently than the model domain similarity measure.

Embodiment 20: The method of embodiments 1-19: further comprising using the applied similarity measure in order to modify at least one of reservoir development, depletion, or management.

The invention claimed is:

1. A computer-implemented method for learning and applying a similarity measure between geophysical objects, the method comprising:
accessing a training dataset comprising training geophysical objects and corresponding training indications of the similarity measure;
estimating, using the accessed training dataset, the similarity measure that inputs the training geophysical objects and outputs the training indications of the similarity measure;
wherein estimating the similarity measure comprises using machine learning in order to learn the similarity measure between the training geophysical objects, the machine learning comprising at least two neural networks operating in parallel, wherein the output of the at least two neural networks are input to a similarity measure function, the similarity measure function generating, based on the output of the at least two neural networks, the indications of the similarity measure; and
applying the similarity measure by inputting the geophysical objects in order to output indications of the similarity measure, thereby indicating similarity between the geophysical objects.

2. The method of claim 1, wherein the machine learning comprises supervised machine learning in which the training indications of the similarity measure between the training geophysical objects are known.

3. The method of claim 1, wherein the at least two convolutional neural networks operating in parallel comprise convolutional neural networks.

4. The method of claim 1, wherein the similarity measure function comprises an l2 distance function.

5. The method of claim 1, wherein the similarity measure is used as part of full wavefield inversion in which an objective function uses the similarity measure as indicative of a degree of similarity between observed and simulated data.

6. The method of claim 1, wherein the similarity measure is tailored to enhancing a seismic image.

7. The method of claim 6, wherein the similarity measure is tailored to edge awareness within the seismic image.

8. The method of claim 7, wherein applying the similarity measure comprises using the similarity measure in order to stack a first set of patches within the seismic image that are similar and exclude a second set of patches within the seismic image in order to perform the edge awareness.

9. The method of claim 1, wherein the similarity measure inputs pairs of the geophysical objects and outputs a respective indication of the similarity measure for the pairs of the geophysical objects.

10. The method of claim 1, wherein the similarity measure inputs sets of the geophysical objects and outputs a respective indications in a similarity measure matrix for the sets of the geophysical objects.

11. The method of claim 1, wherein the similarity measure is tailored to a specific inverse problem.

12. The method of claim 11, wherein multiple similarity measures are generated for a plurality of inverse problems; and
wherein the multiple similarity measures comprises at least two of: filtering; inversion; optimal stacking; quality checking; ranking; well ties; or time-lapse.

13. The method of claim 11, wherein the similarity measure is tailored based on domain type.

14. The method of claim 13, wherein the specific inverse problem has a specific objective function, the specific objective function including at least one of a data domain term and a model domain term; and
wherein the similarity measure is tailored to the at least one of the data domain term for the specific objective function or the model domain term for the specific objective function.

15. The method of claim 14, wherein multiple similarity measures are used to solve the specific objective function for the specific inverse problem including a data domain similarity measure and a model domain similarity measure.

16. The method of claim 15, wherein, in solving the specific objective function, the data domain similarity measure is weighted differently than the model domain similarity measure.

17. The method of claim 1, further comprising using the applied similarity measure in order to modify at least one of reservoir development, depletion, or management.

* * * * *